United States Patent
Arellanes et al.

(10) Patent No.: US 8,214,360 B2
(45) Date of Patent: Jul. 3, 2012

(54) BROWSER CONTEXT BASED SEARCH DISAMBIGUATION USING EXISTING CATEGORY TAXONOMY

(75) Inventors: Paul Thomas Arellanes, Austin, TX (US); Frank Lawrence Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 11/399,212

(22) Filed: Apr. 6, 2006

(65) Prior Publication Data

US 2007/0239734 A1 Oct. 11, 2007

(51) Int. Cl.
*G06F 7/00* (2006.01)
*G06F 17/30* (2006.01)

(52) U.S. Cl. ........................................ 707/731
(58) Field of Classification Search ................ 707/102, 707/3, 999.003, 731, 732, 751
See application file for complete search history.

(56) References Cited

U.S. PATENT DOCUMENTS

| | | | |
|---|---|---|---|
| 6,012,053 A | 1/2000 | Pant et al. | |
| 6,119,124 A | 9/2000 | Broder et al. | |
| 6,167,397 A | 12/2000 | Jacobson et al. | |
| 6,240,409 B1 | 5/2001 | Aiken | |
| 6,289,382 B1 | 9/2001 | Bowman-Amuah | |
| 6,385,602 B1 * | 5/2002 | Tso et al. .............................. | 1/1 |
| 6,493,702 B1 * | 12/2002 | Adar et al. ............................ | 1/1 |
| 6,772,150 B1 | 8/2004 | Whitman et al. | |
| 6,920,448 B2 | 7/2005 | Kincaid et al. | |
| 6,944,612 B2 * | 9/2005 | Roustant et al. .................. | 707/3 |
| 2002/0016786 A1 * | 2/2002 | Pitkow et al. ..................... | 707/3 |
| 2002/0032772 A1 | 3/2002 | Olstad et al. | |
| 2002/0057297 A1 | 5/2002 | Grimes et al. | |
| 2002/0116528 A1 | 8/2002 | Vale | |
| 2002/0174119 A1 | 11/2002 | Kummamuru et al. | |
| 2003/0191753 A1 | 10/2003 | Hoch | |
| 2003/0217052 A1 | 11/2003 | Rubenczyk et al. | |
| 2004/0030741 A1 | 2/2004 | Wolton et al. | |
| 2004/0090472 A1 | 5/2004 | Risch et al. | |
| 2004/0093321 A1 * | 5/2004 | Roustant et al. .................. | 707/3 |
| 2005/0015366 A1 | 1/2005 | Carrasco et al. | |
| 2005/0149496 A1 | 7/2005 | Mukherjee et al. | |
| 2005/0165825 A1 * | 7/2005 | Turski et al. .................... | 707/102 |
| 2005/0216533 A1 * | 9/2005 | Berkhin ........................ | 707/204 |
| 2006/0015498 A1 * | 1/2006 | Sarmiento et al. ................ | 707/6 |
| 2006/0064411 A1 | 3/2006 | Gross et al. | |

OTHER PUBLICATIONS

Arellanes et al., "System and Method for Browser Context Based Search Disambiguation Using a Viewed Content History", U.S. Appl. No. 11/398,866, filed Apr. 6, 2006.
U.S. Appl. No. 11/398,866, 2 pages.

* cited by examiner

*Primary Examiner* — Alexey Shmatov
(74) *Attorney, Agent, or Firm* — Stephen R. Tkacs; Stephen J. Walder, Jr.; Matthew C. Zehrer

(57) ABSTRACT

A mechanism is provided for context based search disambiguation using existing category taxonomy. A client provides additional cues for search term disambiguation through the context of the specific user's browser. A bookmark or favorites data structure is sent along with the search term(s) to be disambiguated. The bookmark data structure acts as pre-existing category taxonomy for a clustering search engine to classify the results of the search. A viewed content history may also be sent along with the search terms to be disambiguated. The viewed content history acts as a cue to a clustering search engine to display as more relevant the results that are classified in the same category as the pages sent along with the search terms.

17 Claims, 8 Drawing Sheets

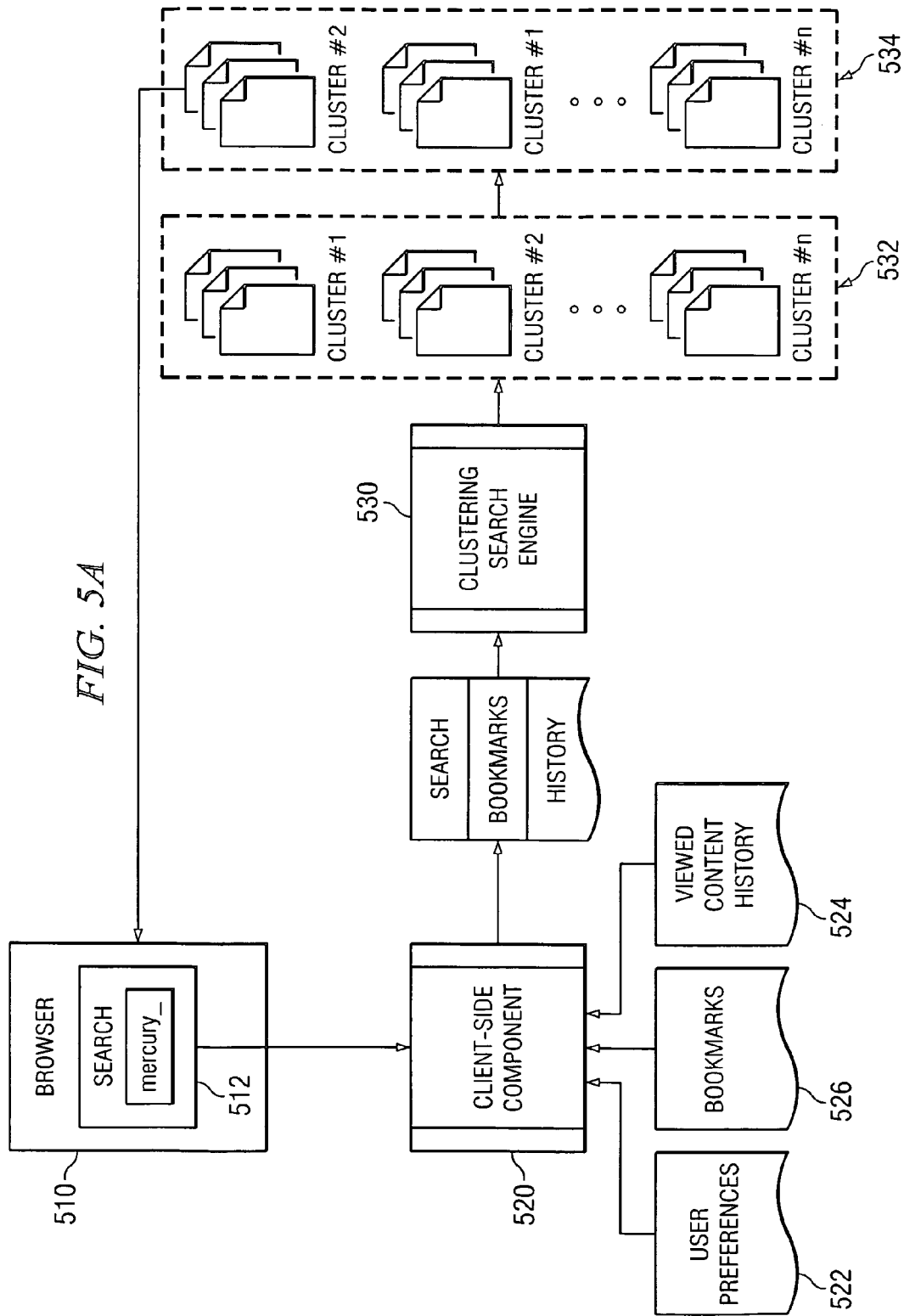

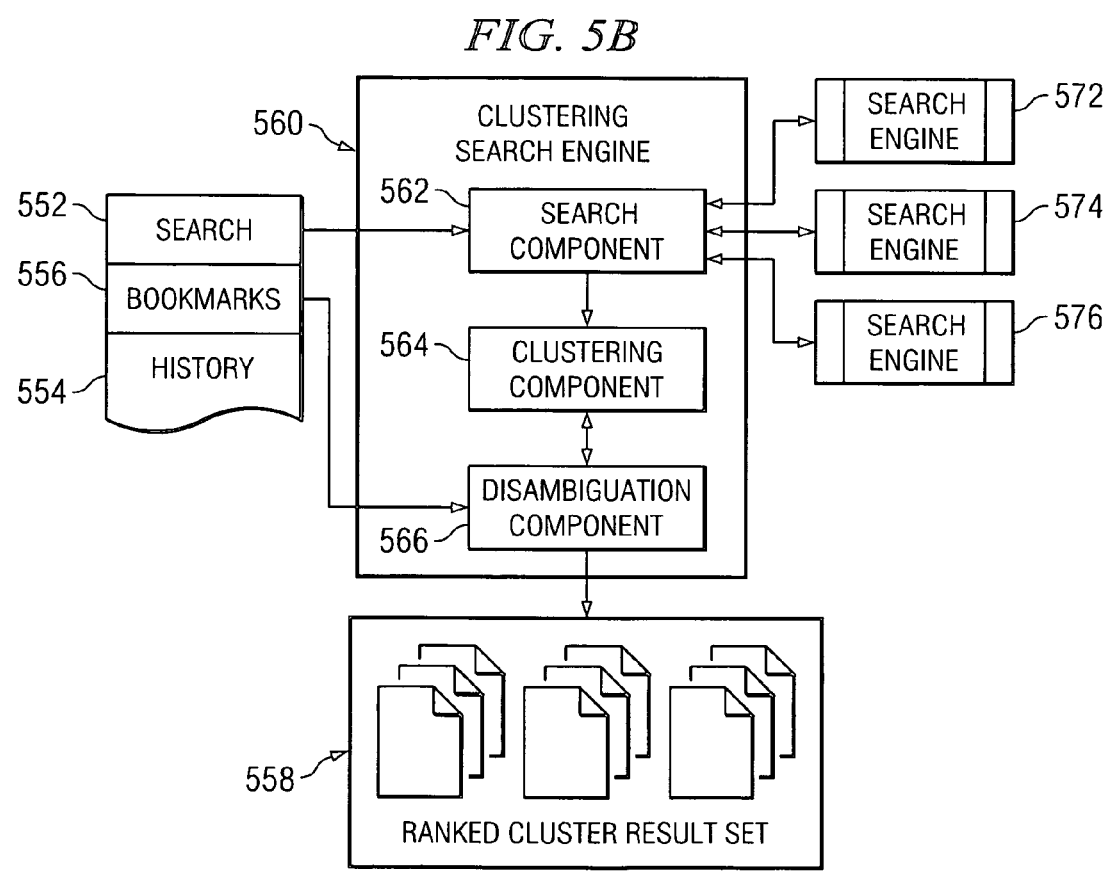

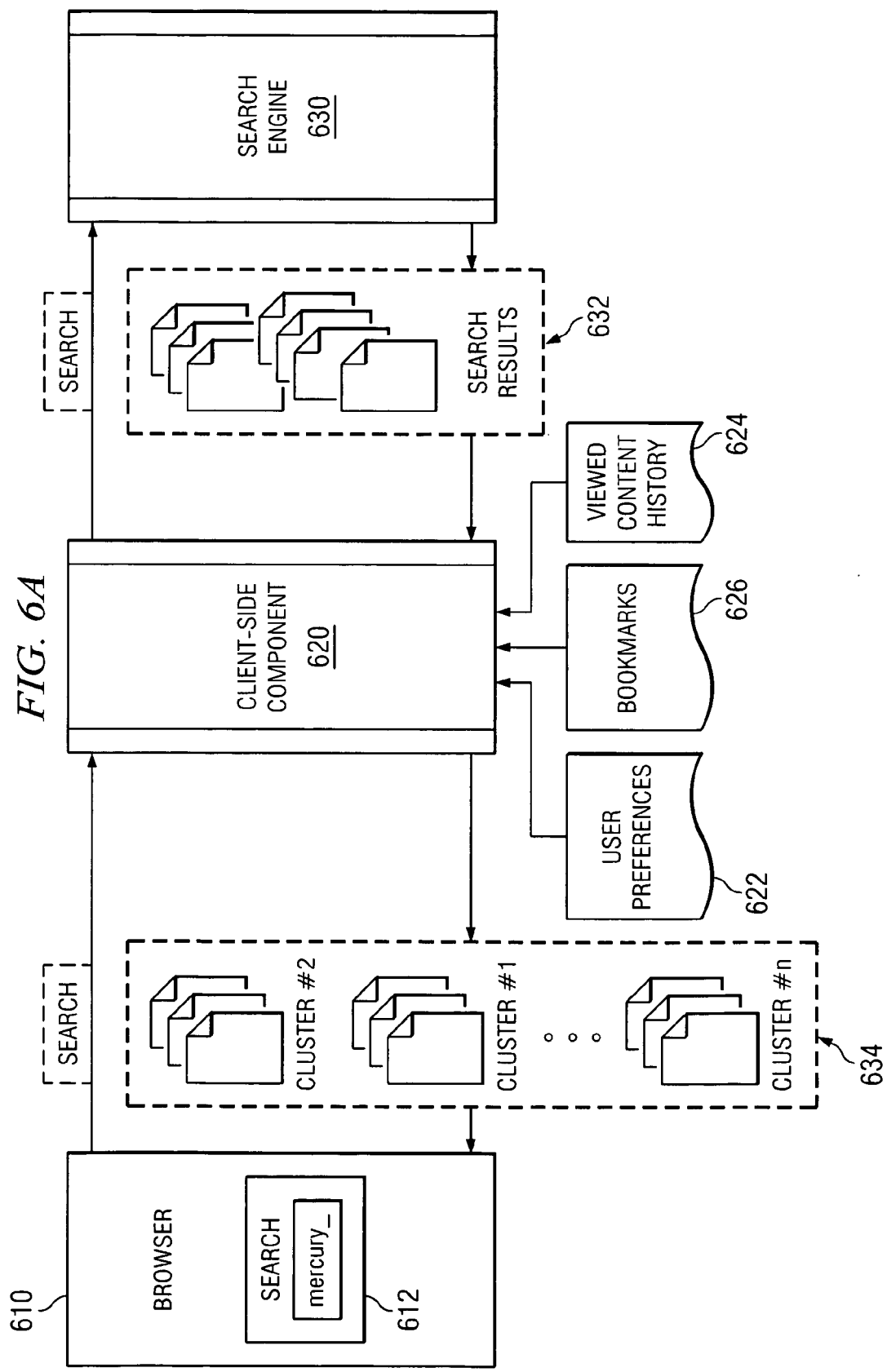

BROWSER CONTEXT BASED SEARCH DISAMBIGUATION USING EXISTING CATEGORY TAXONOMY

BACKGROUND

1. Technical Field

The present application relates generally to an improved data processing system and method. More specifically, the present application is directed to a system and method for browser context based search disambiguation using existing category taxonomy.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized communications and commerce, as well as being a source of both information and entertainment. With respect to transferring data over the Internet, the World Wide Web environment, also referred to simply as "the Web," is used. The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web.

Given the amount of information available through the World Wide Web, search engines have become valuable tools for finding content that is relevant to a given user. A search engine is a software program or Web site that searches a database and gathers and reports information that contains or is related to specified terms. However, given the vast amount of information on the Internet, search results often include millions, or even tens of millions, of matching files, which are referred to as "hits." Many of these hits may be irrelevant to the user's intended search. For example, if a user were to request a search of the term "mercury," the results could include hits related to the element, the automobile manufacturer, the record label, the Roman god, the NASA manned spaceflight project, or some other category.

Once solution to this problem is to include more terms in the search request to disambiguate the search. In the above example, the user may refine the search to include "mercury AND car." However, it is up to the user to determine which terms to add to refine the search.

One high tech solution is to use a clustering search engine, which groups results of the search into clusters. Examples of existing clustering search engines include the Clusty™ search engine, the KartOO search engine, the WebClust search engine, and the QKSearch search engine. "CLUSTY" is a trademark of Vivisimo, Inc. in the Unites States, other countries, or both. These search engines are metasearch engines, which send user requests to several other search engines and/or databases and return the results from each one. They allow users to enter their search criteria only one time and access several search engines simultaneously.

A cluster is a group of similar topics that are related to the original query. The clusters are presented to the user through folders. The aim of this search engine technique is to organize numerous search results into several meaningful categories (clusters). The user gets an overview of the available themes or topics. Via one or two clicks on a folder and/or subfolders, the user may arrive at relevant search results that would be too far down in the ranking of a traditional search engine. In addition, the user may view similar results together in folders rather than scattered throughout a seemingly arbitrary list. For more detailed description of clustering search engines, see for example U.S. Pat. No. 6,119,124 to Broder et al., entitled "Method for Clustering Closely Resembling Data Objects," issued Sep. 12, 2000; and, U.S. Pat. No. 6,167,397 to Jacobson et al., entitled "Method of Clustering Electronic Documents in Response to a Search Query," issued Dec. 26, 2000.

While clustering search engines organize results into categories, these categories are naïve of the intention of the user. Given only a search query, no one category can be given a higher relevancy than any other. In addition, the algorithm used by a typical clustering engine produces human readable category names that may often be ambiguous themselves.

SUMMARY

In one illustrative embodiment, a computer program product comprising a computer usable medium having a computer readable program is provided. The computer readable program, when executed on a clustering search engine, causes the clustering search engine to receive, from a requesting client of a requesting user, a search query and a bookmark data structure and to perform a search to obtain a search result set comprising a plurality of data elements that satisfy the search query. The computer readable program may further cause the clustering search engine to classify the search result set using the bookmark data structure to generate a clustered result set, wherein the clustered result set comprises the plurality of data elements clustered into a base taxonomy of categories and wherein the base taxonomy of categories is defined by the bookmark data structure. In addition, the computer readable program may cause the search front end data processing system to return the clustered result set to the requesting client.

In another illustrative embodiment, an apparatus is provided in a clustering search engine that comprises a processor and a memory coupled to the processor. The memory may contain instructions which, when executed by the processor, cause the processor to receive, from a requesting client of a requesting user, a search query and a bookmark data structure and to perform a search to obtain a search result set comprising a plurality of data elements that satisfy the search query. The instructions may further cause the processor to classify the search result set using the bookmark data structure to generate a clustered result set. The clustered result set may comprise the plurality of data elements clustered into a base taxonomy of categories. The base taxonomy of categories is defined by the bookmark data structure. The instructions may further cause the processor to return the clustered result set to the requesting client.

In a further illustrative embodiment, a method, in a data processing system, is provided for search disambiguation. The method may comprise one or more of the operations described above with regard to the computer readable program.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use, further objectives and advantages thereof, will best be understood by reference to the following detailed description of an illustrative embodiment when read in conjunction with the accompanying drawings, wherein:

FIGS. 5A and 5B are block diagrams illustrating operation of a clustering search system with server side search disambiguation in accordance with an illustrative embodiment;

FIGS. 6A and 6B are block diagrams illustrating operation of a clustering search system with client side search disambiguation in accordance with an illustrative embodiment;

DETAILED DESCRIPTION OF THE PREFERRED EMBODIMENTS

The illustrative embodiments set forth herein provide mechanisms for context based search disambiguation using existing category taxonomy. As such, the mechanisms of the illustrative embodiments are preferably implemented in a distributed data processing environment. In the following description, the mechanisms of the illustrative embodiments will be described in terms of a distributed data processing environment in which there is a network of data processing systems provided that may communicate with one another via one or more networks and communication links.

Figure 1:
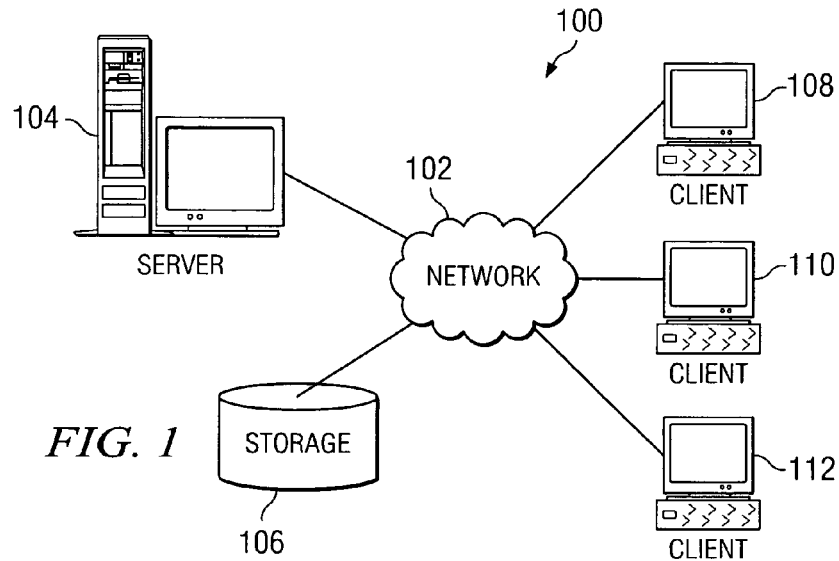
FIG. 1 depicts a pictorial representation of a network of data processing systems in which exemplary aspects of the illustrative embodiments may be implemented.
Figure 2:
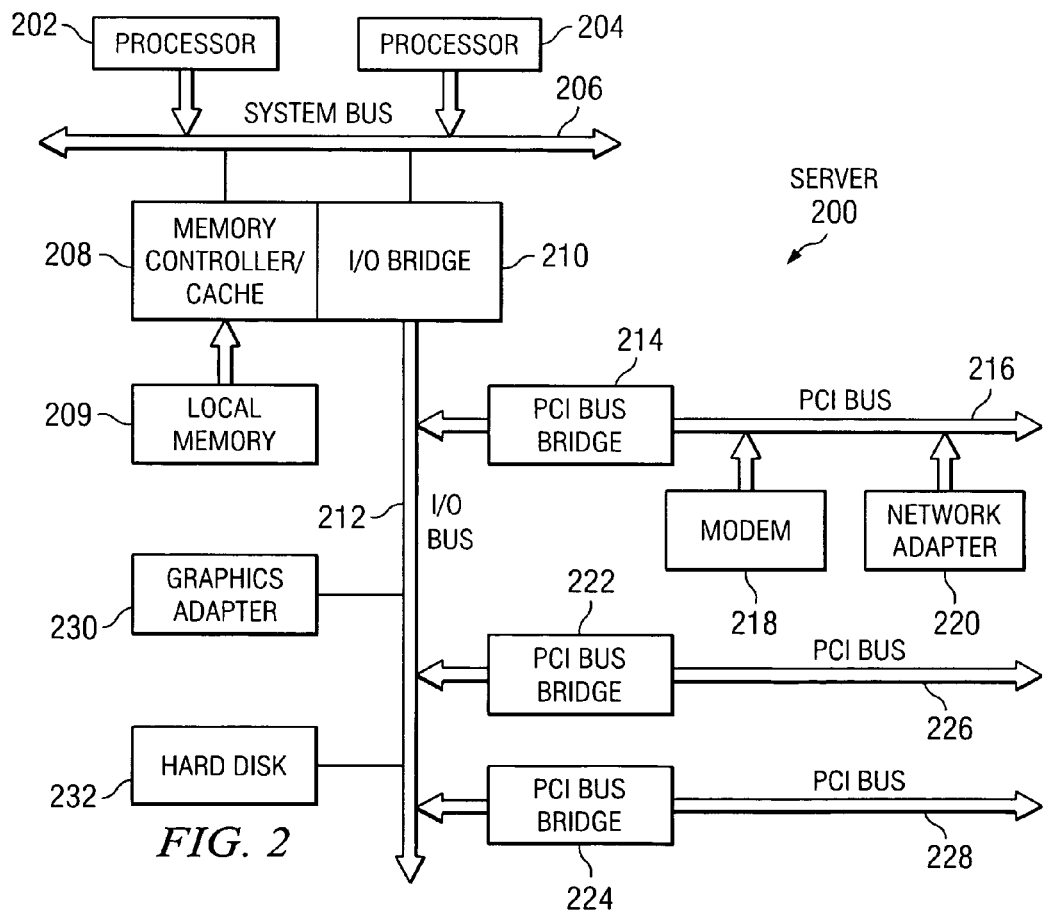
FIG. 2 is a block diagram of a data processing system that may be implemented as a server in accordance with an exemplary embodiment.
Figure 3:
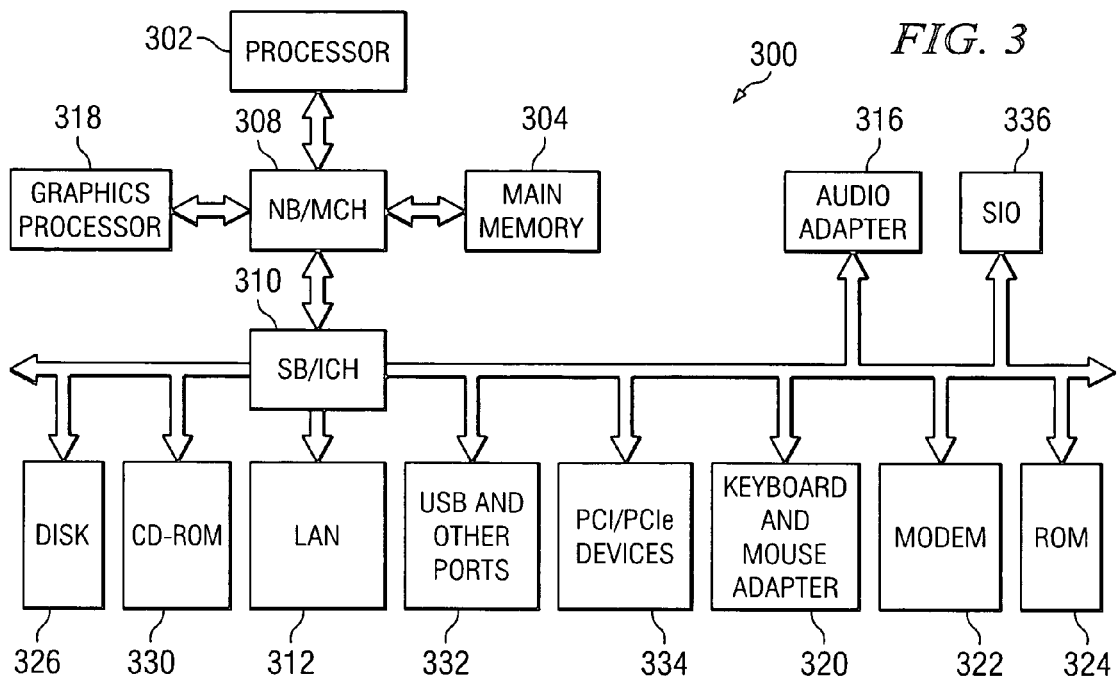
FIG. 3 is a block diagram illustrating a data processing system in which exemplary aspects of the illustrative embodiments are implemented.

FIGS. 1-3 provide examples of data processing environments in which aspects of the illustrative embodiments may be implemented. The depicted data processing environments are only exemplary and are not intended to state or imply any limitation as to the types or configurations of data processing environments in which the exemplary aspects of the illustrative embodiments may be implemented. Many modifications may be made to the data processing environments depicted in FIGS. 1-3 without departing from the spirit and scope of the present invention.

With reference now to the figures, FIG. 1 depicts a pictorial representation of a network of data processing systems in which exemplary aspects of the illustrative embodiments may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the example shown in FIG. 1, server 104 is connected to network 102 along with storage unit 106. In addition, clients 108, 110, and 112 are connected to network 102. These clients 108, 110, and 112 may be, for example, personal computers or network computers. Server 104 may provide data, such as boot files, operating system images, and applications to clients 108-112. Clients 108, 110, and 112 are clients to server 104. Network data processing system 100 may include additional servers, clients, and other devices not shown.

More particularly, server 104 may provide a search engine to users of clients 108-112. A search engine is a software program or Web site that searches a database and gathers and reports information that contains or is related to specified terms. However, given the vast amount of information on the Internet, search results often include millions, or even tens of millions, of matching data elements, which are referred to as "hits." In Internet or Web searches, data elements that are identified as hits may include hypertext markup language (HTML) files, images, text documents, word processing documents, spreadsheets, Usenet newsgroup posts, or any other files or other data elements that may be presented in a Web browser or other document viewer. Many of these hits may be irrelevant to the user's intended search. For example, if a user were to request a search of the term "mercury," the results could include hits related to the element, the automobile manufacturer, the record label, the Roman god, the NASA manned spaceflight project, or some other category.

In accordance with an exemplary aspect, server 104 provides a clustering search engine. A client, such as one of clients 108-112, provides additional cues for search term disambiguation through the context of the specific user's browser. In one embodiment, a data structure of bookmarks, also referred to as "favorites," is sent to the clustering search engine along with the search query to be disambiguated. The bookmark data structure may include a plurality of references to local documents or Internet or Web documents. The bookmark data structure may organize the plurality of references in a hierarchy of folders, for example. The references to documents may be, for instance, a plurality of uniform resource locators (URLs). The clustering search engine may then use the bookmark data structure as category taxonomy in which to classify search results.

In another embodiment, a viewed content history is also sent along with the search term(s) to be disambiguated. The viewed content history may be, for example, the content of a currently viewed page, the content of a number of previously viewed pages, or one or more uniform resource locators from a currently viewed page and/or previously viewed pages in the browser history. The viewed content history acts as a cue to the clustering search engine to display as more relevant the results that are classified in the same category as the pages sent along with the search term(s).

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an exemplary embodiment. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX®) operating system or Linux™ operating system. "eServer," "pSeries," and "AIX" are trademarks of International Business Machines Corporations in the United States, other countries, or both. "LINUX" is a trademark of Linus Torvalds in the United States, other countries, or both.

With reference now to FIG. 3, a block diagram illustrating a data processing system is depicted in which exemplary aspects of the illustrative embodiments are implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards.

In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. "WINDOWS" is a trademark of Microsoft Corporation in the United States, other countries, or both. An object oriented programming system such as the Java™ programming system may run in conjunction with the operating system and provide calls to the operating system from Java™ programs or applications executing on data processing system 300. "JAVA" is a trademark of Sun Microsystems, Inc. in the United States, other countries, or both. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer, hand held computer, or telephone device in addition to taking the form of a PDA. Data processing system 300 also may be a kiosk or a Web appliance.

Figure 4:
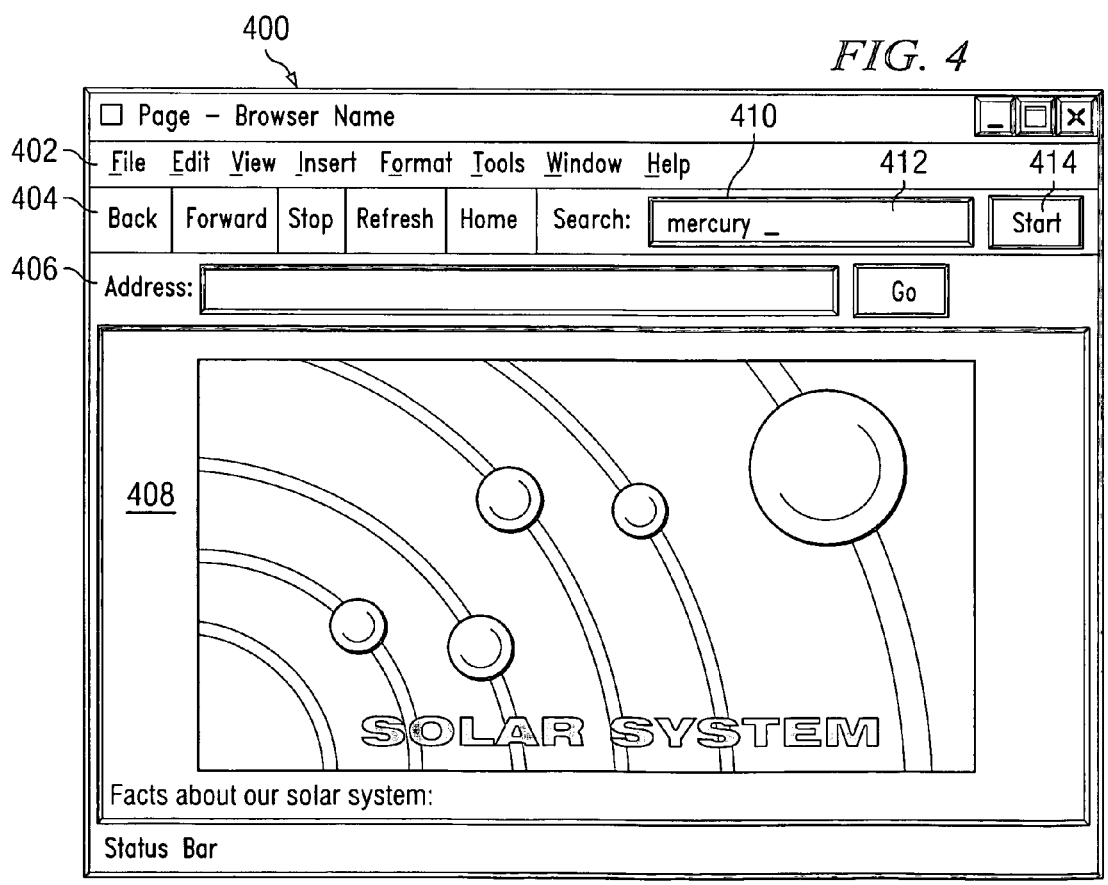
FIG. 4 illustrates an example Web browser display in accordance with an exemplary embodiment.

FIG. 4 illustrates an example Web browser display in accordance with an exemplary embodiment. Browser window 400 includes menu bar 402 and several button bars, including-navigation bar 404, address bar 406, and display area 408. Menu bar 402 provides command menus that allow a user to select commands using a pointing device, such as a mouse. Menu bar 402 also allows the user to select commands using key combinations on a keyboard. The commands available through menu bar 402 may also be represented by buttons on navigation bar 404, for example. Navigation bar 404 provides button controls that allow the user to issue commands for navigation among Web pages. Address bar 406 allows the user to type an explicit page identifier, such as a URL, for a page to be viewed. The current page is presented in display area 408.

In the depicted example, search tool interface 410 allows the user to perform an Internet search for Web documents relevant to a given search term or query. The user may type one or more search terms into field 412. The query may be a single word, a combination of words, or a Boolean expression. To execute the search, the user may select "Start" button 414. Search tool interface 410 may be provided as a component of the Web browser application. However, in an alternative embodiment, search tool interface 410 may be provided as an extension of the browser, i.e. a browser plug-in. Alternatively, the aspects of the exemplary embodiments described herein may also apply to searches originated using a search engine Web page or an application that is external to the Web browser.

When a search is submitted to a search engine, a message is sent to the server that hosts the search engine application. This may be done using an HTTP get request with the search query encoded in a URL. A person of ordinary skill in the art will recognize that other methods of submitting a query to the search engine may be used within the spirit and scope of the exemplary embodiments. The search engine performs the search to obtain results. Then, the search engine generates a Web page containing the results and returns the results page to the requesting client, in this case the Web browser. The results may then be presented in display area 408 of browser window 400.

FIGS. 5A and 5B are block diagrams illustrating operation of a clustering search system with server side search disambiguation in accordance with an illustrative embodiment. With reference to FIG. 5A, at the client, browser 510 receives search query 512 from a user. Client-side component 520 may access viewed content history 524 and bookmarks 526, which are maintained by browser 510. That is, most Web browser applications allow the user to create "bookmarks," alternatively referred to as "favorites," for particular Web documents. A bookmark is a data structure that stores a reference to the page, which may include, for example, a name and a URL, although a bookmark may also include a graphical icon and a description in some implementations. Bookmarks data structure 526 may also organize bookmarks into a hierarchy of folders and subfolders.

Most Web browsers also keep a history of viewed content, generally as a list of URLs organized by date and/or time. Often, the browser application keeps a limited amount of viewed content history information. For example, the browser may keep only the viewed content history for the last ten days; however, this may be customized by the user via a preferences or options interface. Typically, the currently viewed page is considered part of the viewed content history. These customized options of the user may be stored in user preferences 522.

In the depicted example, client-side component 520 sends the search query to clustering search engine 530, along with bookmark and history information. The bookmark information may include all of a part of the bookmark data structure. The history information may be only the currently viewed page or possibly the entire viewed content history. Also, the history information may include the contents of viewed pages, the title information, or the URLs of the viewed pages, for example. In one exemplary embodiment, the amount of bookmark information, the amount of history information, and/or the form of the bookmark and history information to be used for search disambiguation may be set by the user and stored in user preferences 522.

In addition, client-side component 520 may apply rules to determine the amount of viewed content history to use for search disambiguation. As an example, client-side component 520 may use the last ten viewed data elements unless one or more of the viewed data elements were viewed more than one day ago, in which case only the current day's viewed content history would be used.

Client-side component 520 may be a component of browser 510. In an alternative embodiment, client-side component 520 may be an extension of browser 510, i.e. a browser plug-in. Alternatively, client-side component 520 may be a software component within a search engine Web page, such as a Java™ applet or the like, or an application that is external to browser 510. For example, in one alternative embodiment, client-side component 520 is a proxy server.

Clustering search engine 530 receives the search query and history information and performs the search to obtain a search result set. Clustering search engine 530 may conduct the search using known search tools techniques, such as directory listings, Web crawling, and PageRank™ to name a few. "PageRank" is a trademark of Google in the United States, other countries, or both. It is important to note that clustering search engine 530 may be a Web search engine or a search engine for non-Web content.

In accordance with an illustrative embodiment, clustering search engine 530 clusters the search result set into categories based on the bookmark data structure to form clusters 1-n 532, which represent a clustered result set. In this embodiment, the bookmarks form taxonomy of categories. Consider for example, a search of the term "mercury." The results could include hits related to the element, the automobile manufacturer, the record label, the Roman god, the NASA manned spaceflight project, or some other category. In this embodiment, the categories may be "automobiles," "environment," "planets," "music," and "mythology," as defined by the folders and subfolders, if any, in the bookmarks data structure.

These categories are more useful than a seemingly arbitrary list of hits or categories generated by the clustering search engine. The user is able to specifically define and refine the category taxonomy simply by maintaining the bookmarks data structure. The more robust the hierarchy of folders and subfolders, including their contents, the more meaningful the results provided by the clustering search engine will be. Changes in the bookmarks data structure will inherently change the classification system used by the clustering search engine. Furthermore, the user may name the folders and subfolders in a manner that is most meaningful to the user, thus resulting in a more accurate and user-specific clustered result set.

In accordance with another illustrative embodiment, clustering search engine 530 classifies the viewed content history that accompanied the search request into the generated taxonomy. If the viewed content history includes URLs of viewed pages, then clustering search engine 530 retrieves the pages before classifying them. By doing this, clustering search engine 530 may then determine which cluster best fits the intentions of the user based on the user's currently viewed page or viewed content history. If the viewed content history that accompanied the search request includes more than one page or the viewed content history fits into more than one category, then the clusters may be ranked in descending order of the number of documents from the history that fit into each category to form ranked cluster result set 534.

As an example, if the viewed content history includes only the currently viewed page, then the cluster in which the currently viewed page fits is ranked first, before any of the other clusters. As a further example, consider a viewed content history that includes ten viewed pages where four pages fit into cluster #2, three pages fit into cluster #1, two pages fit into cluster #3, and one page fits into cluster #5. In this example, clustering search engine 530 would rank the clusters as #2, #1, #3, #5, and then the remaining clusters. Ranked clusters 534 are then returned to the requesting browser 510. Ranked clusters 534 may be returned as a structured document, such as an extensible markup language (XML) or multipurpose Internet mail extension (MIME) search result set, for example.

Turning to FIG. 5B, operation of a clustering search engine is depicted in accordance with one exemplary embodiment. In this embodiment, clustering search engine 560 receives search 552, bookmarks 556, and viewed content history 554. Clustering search engine 560 may be clustering search engine 530 in FIG. 5A, for example. Clustering search engine 560 receives search 552 at search component 562.

As described above, clustering search engine 560 may be a metasearch engine, which combines searches from multiple search engines 572, 574, and 576. In this case, clustering search engine 560 may be a search front end rather than an actual search engine. As a search front end, clustering search engine 560 obtains a search result set by sending a search request to search engines 572, 574, and 576. While three search engines are shown, any number of search engines may be used depending on the implementation. However, in an alternative embodiment, search component 562 may itself be a search engine. Search component 562 then sends the search result set to clustering component 564.

In accordance with an illustrative embodiment, clustering component 564 clusters the search result set into categories to form clusters using bookmarks 556 as base category taxonomy. That is, disambiguation component 566 receives bookmarks 556 as pre-existing category taxonomy. Clustering component 564 then classifies results into the pre-existing taxonomy rather than generating category taxonomy based on the search results. This provides more control to the user, and, as a consequence, the final result set is more meaningful to the user.

In a further embodiment, disambiguation component 566 may receive viewed content history 554 and provide the viewed content history as a disambiguation result set. Clustering component 564 may then classify the disambiguation result set and ranks the categories. Disambiguation component 566 then returns ranked cluster result set 558 to the requesting user.

Figure 6B:
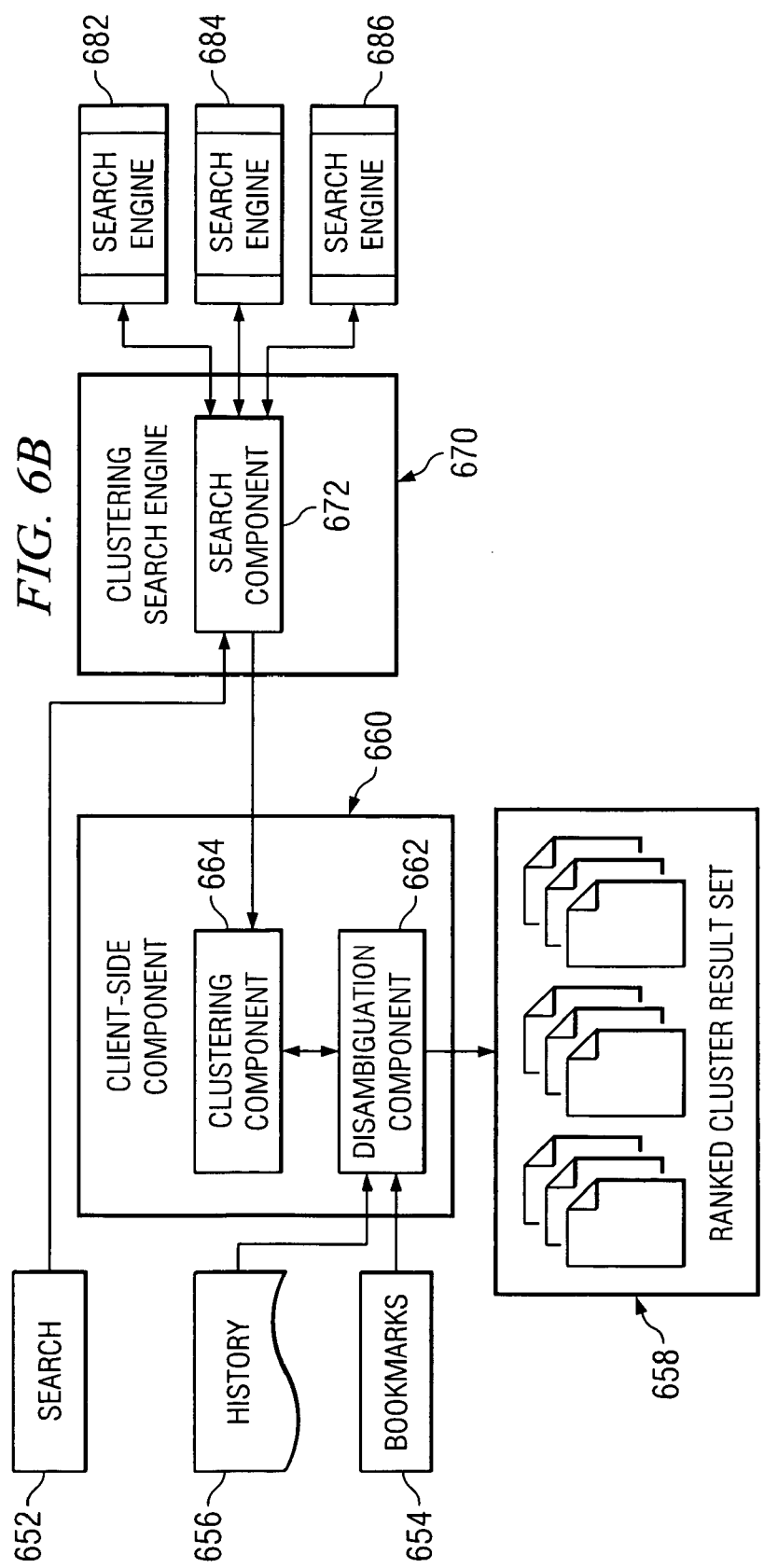

FIGS. 6A and 6B are block diagrams illustrating operation of a clustering search system with client side search disambiguation in accordance with an illustrative embodiment. With reference to FIG. 6A, at the client, browser 610 receives search query 612 from a user. In the depicted example, client-side component 620 sends the search query to search engine 630. Search engine 630 receives the search query and performs the search to obtain search results 632. It is important to note that search engine 630 may be a Web search engine or a search engine for non-Web content.

Client-side component 620 receives bookmark information 626 and clusters search results 632 into categories using bookmarks information 626 as base category taxonomy to form clusters 1-n. These categories are more useful than a seemingly arbitrary list of hits or categories generated by the clustering search engine.

Further, client-side component 620 may access viewed content history 624, which is maintained by browser 610. The history information may be only the currently viewed page or possibly the entire viewed content history. Also, the history information may include the contents of viewed pages, the title information, or the URLs of the viewed pages, for example. In one exemplary embodiment, the amount of history information and/or the form of the history information to be used for search disambiguation may be set by the user and stored in user preferences 622.

Client-side component 620 may be a component of browser 610. In an alternative embodiment, client-side component 620 may be an extension of browser 610, i.e. a browser plug-in. Alternatively, client-side component 620 may be a software component within a search engine Web page, such as a Java™ applet or the like, or an application that is external to browser 610. For example, in one alternative embodiment, client-side component 620 is a proxy server.

In accordance with an illustrative embodiment, client-side component 620 classifies the viewed content history into the generated taxonomy within clusters that are based on bookmarks 626. If the viewed content history includes URLs of viewed pages, then client-side component 620 retrieves the pages before classifying them. By doing this, client-side component 620 may then determine which cluster best fits the intentions of the user based on the user's currently viewed page or viewed content history. If the viewed content history that accompanied the search request includes more than one page or the viewed content history fits into more than one category, then the clusters may be ranked in descending order of the number of documents from the history that fit into each category to form ranked cluster result set 634. Ranked cluster result set 634 is then returned to the requesting browser 610.

Turning to FIG. 6B, operation of a client-side component, in cooperation with a clustering search engine, is depicted in accordance with one exemplary embodiment. In this embodiment, clustering search engine 670 receives search 652. Search engine 670 may be search engine 630 in FIG. 6A, for example. Search engine 670 receives search 652 at search component 672. Search 652 may be sent directly to search engine 670 or may be forwarded by client-side component 660.

As described above, search engine 670 may be a metasearch engine, which combines searches from multiple search engines 682, 684, and 686. In this case, clustering search engine 670 may be a search front end rather than an actual search engine. As a search front end, clustering search engine 670 obtains a search result set by sending a search request to search engines 682, 684, and 686. While three search engines are shown, any number of search engines may be used depending on the implementation. However, in an alternative embodiment, search component 672 may itself be a search engine. Search component 672 then sends the search result set to client-side component 660.

Client-side component 660 includes disambiguation component 662 and clustering component 664. Clustering component 664 may be similar in function to clustering component 564 in FIG. 5B. Disambiguation component 662 receives bookmark information 654 and provides the bookmark information to clustering component 664 as base category taxonomy. Clustering component 664 clusters the search result set into categories based on bookmark information 654 to form clusters and returns the clustered result set to disambiguation component 662.

Further to the above, disambiguation component 662 may receive viewed content history 654 and provide the viewed content history as a disambiguation result set to clustering component 664. Clustering component 664 may then classify the disambiguation result set and ranks the categories. Disambiguation component 662 then returns ranked cluster result set 656 to the requesting user.

Figure 7:
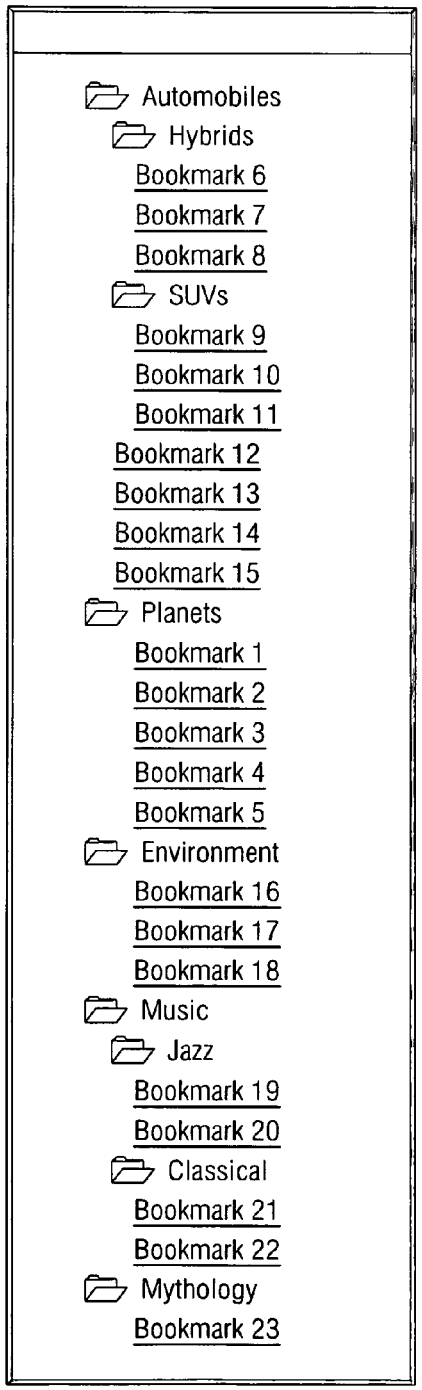
FIG. 7 depicts an example bookmark data structure in accordance with an illustrative embodiment.

FIG. 7 depicts an example bookmark data structure in accordance with an illustrative embodiment. In this example, the bookmark data structure includes folders named "Automobiles," "Planets," "Environment," "Music," and "Mythology." These folders are generally named by the user and have specific meaning to the user.

Generally speaking folders include bookmarks. However, in the depicted example, some folders also include subfolders. For instance, the "Automobiles" folder includes subfolders named "Hybrids" and "SUVs." Also, the "Music" folder includes subfolders named "Jazz" and "Classical." Furthermore, subfolders may include bookmarks and even more subfolders. In this way, the user may set forth a robust hierarchy of categories, thus providing pre-existing taxonomy for a clustering search engine.

Figure 8:
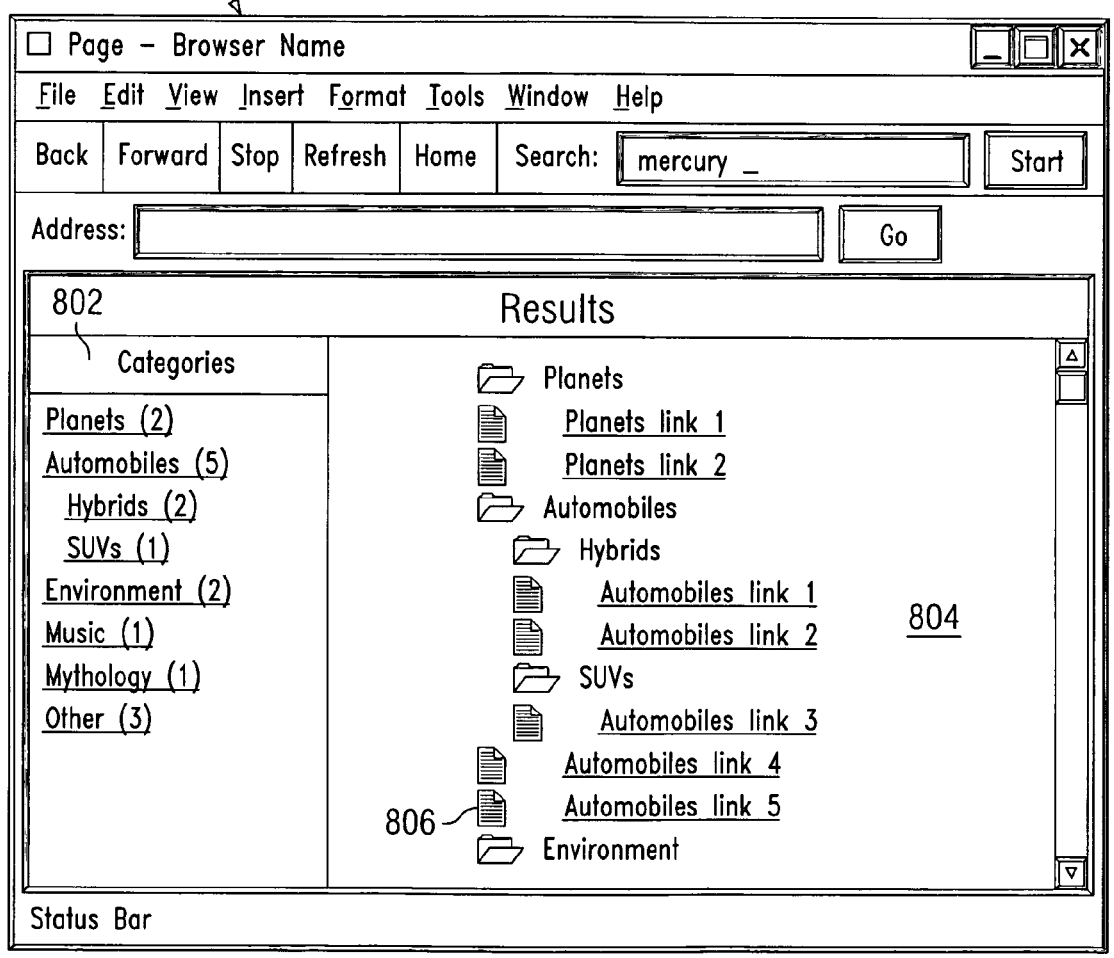
FIG. 8 illustrates an example Web browser display presenting a results page in accordance with an exemplary embodiment.

FIG. 8 illustrates an example Web browser display presenting a results page in accordance with an exemplary embodiment. Browser window 800 includes a display area that presents a results page that is received responsive to submitting a search query and receiving clustered search results that use a bookmarks data structure as pre-existing category taxonomy and are disambiguated based on browser history. In the depicted example, the results page includes categories portion 802 and hits portion 804. Categories portion 802 presents the categories, which are based on the user's bookmark hierarchy, in descending order of relevancy to the viewed content history.

Hits portion 804 presents the hits, represented here as links to matching Web documents, with the most relevant category listed first. Again, the categories are based on the user's bookmark hierarchy and, thus, present an organization of categories that is specifically meaningful to the user.

In addition, in the depicted example, each hit or link has an associated selectable bookmark control 806. If the user selects bookmark control 806, the Web browser may add that link as a bookmark in the particular category in which it is classified. That is, the results page may include bookmark control and embedded information identifying the category taxonomy. The Web browser may then use this information to place the link in the appropriate bookmark folder (or subfolder) automatically.

Figure 9:
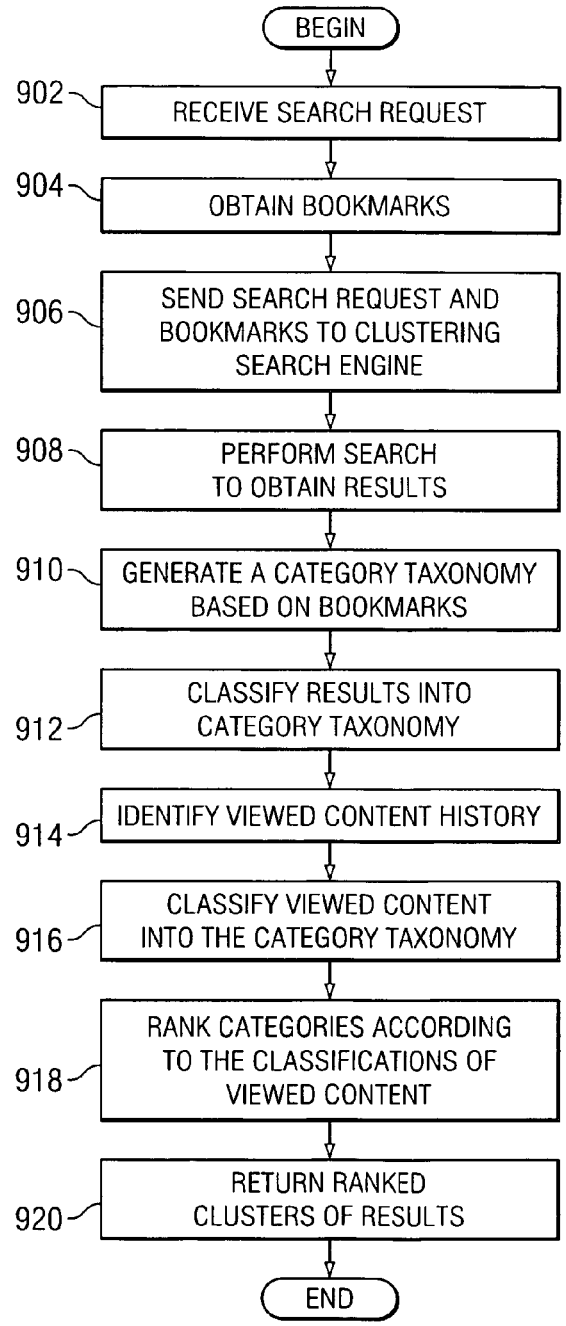
FIG. 9 is a flowchart illustrating operation of a clustering search system with search disambiguation in accordance with an exemplary embodiment.

FIG. 9 is a flowchart illustrating operation of a clustering search system with search disambiguation in accordance with an exemplary embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

More particularly, with reference to FIG. 9, Operation begins and a client component receives a search request (block 902). The client component obtains bookmark information (block 904). Next, the client component sends the search request with bookmark information to a clustering search engine (block 906). In one embodiment, the clustering search engine may be a search engine at a remote server; however, in an alternative embodiment, the clustering search engine may be a clustering component at the client that works in cooperation with a remote search engine. The clustering search engine performs a search to obtain results (block 908). The clustering search engine generates category taxonomy based on the bookmark information (block 910) and classifies the search results into the category taxonomy (block 912).

A cluster ranking component identifies a viewed content history (block 914) and classifies the viewed content history into the category taxonomy (block 916). As described above, the cluster ranking component may be a client-side software component, such as a Web browser component, a browser plug-in, or a stand-alone software application. Alternatively, the cluster ranking component may be a component of the clustering search engine. Next, the cluster ranking component ranks the categories according to the classifications of the viewed content history (block 918). Thereafter, the ranked clusters of results are returned to the requesting user (block 920) and operation ends.

Thus, the illustrative embodiments solve the disadvantages of the prior art by providing a mechanism for context based search disambiguation using existing category taxonomy. A client provides additional cues for search term disambiguation through the context of the specific user's browser. In one embodiment, a bookmark or favorites data structure is sent along with the search term(s) to be disambiguated. The bookmark data structure acts as pre-existing category taxonomy for a clustering search engine to classify the results of the search.

In another embodiment, a viewed content history is sent along with the search term(s) to be disambiguated. The viewed content history acts as a cue to a clustering search engine to display as more relevant the results that are classified in the same category as the pages sent along with the search term(s).

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a clustering search engine data processing system, for search disambiguation, the method comprising:
    receiving, from a requesting client of a requesting user, a search query, a bookmark data structure, and a viewed content history of the requesting user, wherein the viewed content history comprises at least a portion of a browser history maintained by the Web browser at the requesting client;
    performing a search to obtain a search result set comprising a plurality of data elements that satisfy the search query;
    classifying the search result set using the bookmark data structure to generate a clustered result set, wherein the clustered result set comprises the plurality of data elements clustered into a base taxonomy of categories and wherein the base taxonomy of categories is defined by the bookmark data structure;
    classifying, at the clustering search engine, the viewed content history of the requesting user into the base taxonomy of categories, wherein the base taxonomy of categories comprises a plurality of categories; and
    ranking, at the clustering search engine, the categories of the clustered result set according to the classification of the viewed content history to form a ranked cluster result set; and
    returning the raked clustered result set to the requesting client,
    wherein the bookmark data structure is maintained by a Web browser at the requesting client.

2. The method of claim 1, wherein the bookmark data structure comprises a hierarchy of folders and wherein at least one folder in the hierarchy of folders has at least one bookmark stored therein.

3. The method of claim 2, wherein at least one folder in the hierarchy of folders has at least one subfolder.

4. The method of claim 3, wherein the base taxonomy of categories comprises a category for each folder within the hierarchy of folders and a subcategory for each of the at least one subfolder.

5. The method of claim 2, further comprising:
    presenting the clustered result set to the requesting user according to the hierarchy of folders.

6. The method of claim 1, further comprising:
    presenting a selectable control in association with a given data element in the clustered result set,
    such that responsive to the requesting user selecting the selectable control, the requesting client stores a bookmark for the given data element within a corresponding folder or subfolder in the bookmark data structure.

7. A computer program product comprising a computer recordable storage medium having a computer readable program recorded thereon, wherein the computer readable program, when executed on a clustering search engine, causes the clustering search engine to:
    receive, from a requesting client of a requesting user, a search query, a bookmark data structure, and a viewed content history of the requesting user, wherein the viewed content history comprises at least a portion of a browser history maintained by the Web browser at the requesting client;
    perform a search to obtain a search result set comprising a plurality of data elements that satisfy the search query;
    classify the search result set using the bookmark data structure to generate a clustered result set, wherein the clustered result set comprises the plurality of data elements clustered into a base taxonomy of categories and wherein the base taxonomy of categories is defined by the bookmark data structure;
    classify the viewed content history of the requesting user into the base taxonomy of categories, wherein the base taxonomy of categories comprises a plurality of categories; and
    rank the categories of the clustered result set according to the classification of the viewed content history to form a ranked cluster result set; and
    return the ranked clustered result set to the requesting client,
    wherein the bookmark data structure is maintained by a Web browser at the requesting client.

8. The computer program product of claim 7, wherein the bookmark data structure comprises a hierarchy of folders and wherein at least one folder in the hierarchy of folders has at least one bookmark stored therein.

9. The computer program product of claim 8, wherein the base taxonomy of categories comprises a category for each folder within the hierarchy of folders.

10. The computer program product of claim 8, wherein at least one folder in the hierarchy of folders has at least one subfolder.

11. The computer program product of claim 10, wherein the base taxonomy of categories comprises a category for each folder within the hierarchy of folders and a subcategory for each of the at least one subfolder.

12. The computer program product of claim 8, wherein the computer readable program further causes the clustering search engine to:

present the clustered result set to the requesting user according to the hierarchy of folders.

13. The computer program product of claim 7, wherein the computer readable program further causes the clustering search engine to:

present a selectable control in association with a given data element in the clustered result set, such that responsive to the requesting user selecting the selectable control, the requesting client stores a bookmark for the given data element within a corresponding folder or subfolder in the bookmark data structure.

14. An apparatus in a clustering search engine, comprising:
a processor; and
a memory coupled to the processor, wherein the memory comprises instructions which, when executed by the processor, cause the processor to:

receive, from a requesting client of a requesting user, a search query, a bookmark data structure, and a viewed content history of the requesting user, wherein the viewed content history comprises at least a portion of a browser history maintained by the Web browser at the requesting client;

perform a search to obtain a search result set comprising a plurality of data elements that satisfy the search query;

classify the search result set using the bookmark data structure to generate a clustered result set, wherein the clustered result set comprises the plurality of data elements clustered into a base taxonomy of categories and wherein the base taxonomy of categories is defined by the bookmark data structure;

classify the viewed content history of the requesting user into the base taxonomy of categories, wherein the base taxonomy of categories comprises a plurality of categories;

rank the categories of the clustered result set according to the classification of the viewed content history to form a ranked cluster result set; and return the clustered result set to the requesting client, wherein the bookmark data structure is maintained by a Web browser at the requesting client.

15. The apparatus of claim 14, wherein the bookmark data structure comprises a hierarchy of folders, wherein at least one folder in the hierarchy of folders has at least one bookmark stored therein, and wherein the base taxonomy of categories comprises a category for each folder within the hierarchy of folders.

16. The apparatus of claim 15, wherein at least one folder in the hierarchy of folders has at least one subfolder and wherein the base taxonomy of categories comprises a category for each folder within the hierarchy of folders and a subcategory for each of the at least one subfolder.

17. The apparatus of claim 14, wherein the instructions further cause the processor to:

present a selectable control in association with a given data element in the clustered result set, such that responsive to the requesting user selecting the selectable control, the requesting client stores a bookmark for the given data element within a corresponding folder or subfolder in the bookmark data structure.

* * * * *